United States Patent
Tola, Jr.

(10) Patent No.: US 9,348,927 B2
(45) Date of Patent: May 24, 2016

(54) SYSTEMS AND METHODS FOR DETECTING, IDENTIFYING AND CATEGORIZING INTERMEDIATE NODES

(75) Inventor: Kenneth C. Tola, Jr., Westfield, NJ (US)

(73) Assignee: Smart Security Systems LLC, Boulder, CO (US)

( * ) Notice: Subject to any disclaimer, the term of this patent is extended or adjusted under 35 U.S.C. 154(b) by 0 days.

(21) Appl. No.: 13/465,799

(22) Filed: May 7, 2012

(65) Prior Publication Data

US 2013/0297606 A1 Nov. 7, 2013

(51) Int. Cl.
*G06F 17/30* (2006.01)
*H04L 29/08* (2006.01)
*H04L 29/06* (2006.01)

(52) U.S. Cl.
CPC ...... *G06F 17/30873* (2013.01); *H04L 67/2809* (2013.01); *H04L 63/1466* (2013.01)

(58) Field of Classification Search
USPC .................. 707/623, 736, 737; 709/223, 232
See application file for complete search history.

(56) References Cited

U.S. PATENT DOCUMENTS

| | | | |
|---|---|---|---|
| 6,131,163 A | 10/2000 | Wiegel | |
| 6,212,574 B1 | 4/2001 | O'Rourke et al. | |
| 6,408,061 B1 | 6/2002 | Donak et al. | |
| H2065 H | 5/2003 | Hong et al. | |
| 6,690,678 B1 * | 2/2004 | Basso | H04L 12/5602 370/395.1 |
| 6,850,986 B1 | 2/2005 | Peacock | |
| 7,293,095 B2 | 11/2007 | Gbadegesin | |
| RE41,168 E | 3/2010 | Shannon | |
| 7,777,651 B2 | 8/2010 | Fallon et al. | |
| RE41,811 E | 10/2010 | Gutman et al. | |
| RE42,212 E | 3/2011 | Hoffman | |
| 8,019,884 B2 | 9/2011 | Manning et al. | |
| 8,020,201 B2 | 9/2011 | Adusumilli et al. | |
| 2002/0024931 A1 * | 2/2002 | Chikazawa | H04L 1/22 370/228 |
| 2003/0101253 A1 * | 5/2003 | Saito | H04L 45/02 709/223 |
| 2007/0011146 A1 * | 1/2007 | Holbrook | G06Q 30/0603 |
| 2007/0150075 A1 * | 6/2007 | Dumas | G06F 8/20 700/29 |
| 2007/0300290 A1 * | 12/2007 | Shay | H04L 63/0428 726/3 |
| 2008/0279198 A1 * | 11/2008 | Gruber | H04L 45/10 370/400 |
| 2008/0281900 A1 | 11/2008 | Boulia | |
| 2009/0006612 A1 | 1/2009 | Asai | |
| 2009/0119752 A1 | 5/2009 | Chandrashekhar et al. | |
| 2009/0157883 A1 | 6/2009 | Maffeis | |
| 2009/0172802 A1 | 7/2009 | Mosek et al. | |
| 2009/0177761 A1 | 7/2009 | Meyer et al. | |
| 2009/0182803 A1 | 7/2009 | Barton et al. | |
| 2009/0249467 A1 | 10/2009 | Webb-Johnson | |
| 2009/0313290 A1 | 12/2009 | Narayanan et al. | |
| 2009/0319661 A1 * | 12/2009 | Shiozawa | H04L 9/12 709/225 |
| 2010/0064234 A1 | 3/2010 | Schreiber et al. | |
| 2010/0153568 A1 | 6/2010 | Uola et al. | |
| 2010/0162235 A1 | 6/2010 | Ginzton et al. | |

(Continued)

OTHER PUBLICATIONS

Tokekar et al. International Journal of Computer Applications (0975-8887) 2010, vol. 1.*

(Continued)

*Primary Examiner* — Ahmed Abraham
(74) *Attorney, Agent, or Firm* — Conley Rose, P.C.

(57) ABSTRACT

A system and method for obtaining node information from a variety of potential sources and storing the information in a logical repository, and a system and method for identifying and categorizing Intermediate Nodes using a combination of requesting and responding node information.

53 Claims, 6 Drawing Sheets

(56) References Cited

U.S. PATENT DOCUMENTS

| | | |
|---|---|---|
| 2010/0174817 A1 | 7/2010 | Chetuparambil et al. |
| 2010/0175122 A1 | 7/2010 | Ballard |
| 2010/0205215 A1 | 8/2010 | Cook et al. |
| 2010/0226256 A1 | 9/2010 | Kato et al. |
| 2010/0268782 A1 | 10/2010 | Zombek et al. |
| 2011/0016197 A1 | 1/2011 | Shiimori et al. |
| 2011/0209199 A1 | 8/2011 | Fenton et al. |
| 2011/0214131 A1 | 9/2011 | Luna |
| 2011/0216680 A1 | 9/2011 | Vogt et al. |
| 2011/0219057 A1 | 9/2011 | Scoda |
| 2011/0225646 A1 | 9/2011 | Crawford |
| 2011/0231479 A1 | 9/2011 | Boydstun et al. |
| 2011/0231555 A1 | 9/2011 | Ebrahimi et al. |
| 2011/0231652 A1 | 9/2011 | Bollay et al. |
| 2011/0231923 A1 | 9/2011 | Bollay et al. |
| 2011/0282997 A1 | 11/2011 | Prince et al. |
| 2012/0011098 A1* | 1/2012 | Yamada .............. G06F 11/1443 707/623 |
| 2012/0246126 A1* | 9/2012 | Rodriguez ........ G06F 17/30073 707/692 |
| 2013/0297703 A1* | 11/2013 | Van Ackere .......... H04L 67/104 709/204 |

OTHER PUBLICATIONS

Extended European Search Report dated Dec. 8, 2015, for European application No. 13788414.4.

\* cited by examiner

SYSTEMS AND METHODS FOR DETECTING, IDENTIFYING AND CATEGORIZING INTERMEDIATE NODES

FIELD OF THE INVENTION

The present invention relates to obtaining information for intermediate nodes through which target content can be obtained and, in particular, to systems and methods for detecting, identifying and categorizing intermediate nodes, including determining the type and capabilities of intermediate nodes.

BACKGROUND OF THE INVENTION

Web tracking solutions can generally be separated into solutions loaded into a customer's server, for example, packet "sniffing" and IIS log file analysis software, and solutions that attempt to track page level activity and which take the form of code inserted on a page, third party Web "cookies" or software applications.

Various countries, corporations and Internet Service Providers block, censor or filter communications transmitted between two or more nodes. These communications can occur via Internet, Extranet, Intranet or any other communication path that allows two nodes to communicate with one another. The type of communication is further independent of communication path and includes, but is not limited to, client/server, peer-to-peer and mainframe architectures. All types of communications, including but not limited to wireless, cellular, wired, optical and satellite communications may be subject to censorship. Moreover various modes of communication including, but not limited to, client-server, mainframe, distributed and peer-to-peer, are subject to censorship.

For example, a user may subscribe to an Internet sports package to watch sporting events over a network. The user can request and watch so-called out of market games, but the games are often censored (referred to as "blacked out") when the team is playing locally and the televised version of the game is available on local free or pay television channels. The distributor of the content identifies the source of the content request and denies the request when the source is within the blackout areas.

Figure 1:
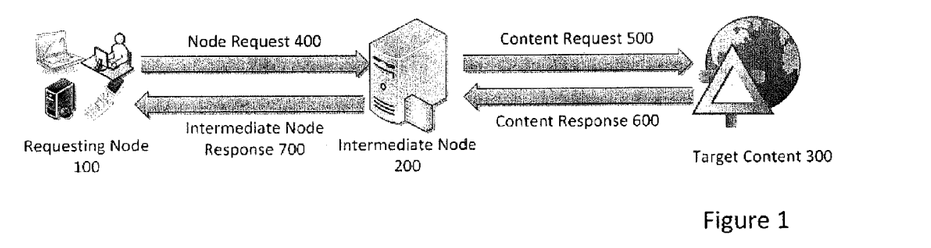
FIG. 1 is a schematic diagram that shows a system including an Intermediate Nodes 200 utilized to send and receive requests for Target Content 300.

FIG. 1 shows a system including an Intermediate Node 200 utilized to send and receive requests for Target Content 300. Intermediate Nodes 200, for example proxy servers, were created in part to overcome censorship. Intermediate Nodes 200 come in a variety of configurations, capabilities, uses and placement with a requirement that, at some point, they respond to a request for Target Content 300 from a Requesting Node 100. Caching aside, the Node Request 400 for Target Content 300 is not targeted at information typically stored locally by the Intermediate Node 200. Rather, the Node Request 400 is focused on information typically stored on yet another logical node, referred to herein as a Responding Node 1400, which is physically or logically separate from the Intermediate Node 200. The Target Content 300 can be any content, for example, a service, a file, a connection, a web page, multimedia or any other resource available over a network.

As another example, a user living in Los Angeles, Calif., representing a possible Requesting Node 100 may normally be blocked from obtaining Target Content 300, e.g., online TV, from a specific website which represents a Responding Node 1400, because that representative website is configured to only serve content to users in the state of New York. Referring to FIG. 1, the user (at Requesting Node 100) may find an Intermediate Node 200 which requests the content from the Responding Node 1400 from within the state of New York. The user sends a request for the content on the target website to the Intermediate Node 200, and the Intermediate Node 200 obtains the content, unrestricted in this example, from the target website and returns the content to the user in Los Angeles.

A given Intermediate Node 200 can cache obtained Target Content 300 and still be considered an Intermediate Node 200 as long as the Requesting Node 100 is attempting to obtain data from the Responding Node 1400. The data may be as simple as a low level communications request to check if a target server exists, or the data may be as complex as is supported on the communication path used and by the type of communications selected.

Nodes are logical constructs that can be physically implemented as a discrete node, as part of other logical nodes or as a system. Requesting Nodes 100, Intermediate Nodes 200 and Responding Nodes 1400 may exist at the same physical location, at completely disparate physical locations or at any combination thereof. Logical nodes may be comprised of different parts of a larger system, be themselves independent systems or be combined together in any combination. For example, a group of networked computers may each utilize a shared access point that is, itself, acting on behalf of a single logical node.

Many Intermediate Nodes 200 do not provide visibility to their data retrieval activities, and this lack of visibility causes difficulties with respect to the conventional use of Intermediate Nodes 200. Many Intermediate Nodes 200 do not provide the services that they purport to offer and, in fact, many nefarious Intermediate Nodes 200 cause more harm than any benefit they may provide. Harmful Intermediate Nodes 200 may download malicious content onto a Requesting Node 100, infiltrate the Requesting Node 100 by utilizing an array of techniques or promote the location of the Requesting Node 100 to dangerous third party groups. The Requesting Node 100 has almost no inherent protection from harmful Intermediate Nodes 200.

Moreover, using an Intermediate Node 200 through any sort of manual effort can be both technically challenging and time consuming for a typical end user. Intermediate Node 200 usage may require entries to be made in special sections of a Requesting Node's 100 operating system, file directory or some other configuration option, either directly or indirectly, and the only manner in which to determine if an Intermediate Node 200 is a viable and functional option is typically to use the Intermediate Node 200 and hope that nothing harmful occurs to the Requesting Node 100. Given the large number of Intermediate Nodes 200 providing intermittent connectivity, an end user may have to attempt to use hundreds or more of Intermediate Nodes 200 prior to finding a somewhat viable option.

Compounding these problems with the conventional use of Intermediate Nodes 200 is that an apparently functional Intermediate Node 200 may hide additional data within the Target Content 300 or perform actions beyond the scope of the Responding Node 1400 that can directly or indirectly affect the Requesting Node 100. While an end user may find an apparently functional Intermediate Node 200, through which requests for Target Content 300 are fulfilled, the end user may have no idea if the Intermediate Node 200 is also downloading malicious content or performing other potentially harmful operations. Furthermore, the end user has no way of knowing from which geographic region a given Intermediate Node 200 is sending out Content Requests 500 to the Responding Node 1400. Overcoming censorship may rely on being perceived as requesting information from a distinct and safe geographic region but, given the conventional options in the market, choosing a specific location for an Intermediate Node 200 is not possible.

It should be noted that an end user is not required. Automated machine-to-machine communications, routing between systems, networking devices and other communication-related efforts may utilize an Intermediate Node 200 in place of an end user. An end user can, therefore, be a human, a computer, a program or some portion of code that produces a Node Request 400. Node Requests 400 may be generated directly or indirectly with or without knowledge of the Intermediate Node 200. Content Requests 500 need not be defined as distinct or separate from the Node Requests 400, because the Content Request 500 can be a routed Node Request 400 or a context-based new message.

SUMMARY OF THE INVENTION

The present invention provides a system and method that protects Requesting Nodes from harmful Intermediate Nodes while allowing Requesting Nodes to determine the functionality and location of Intermediate Nodes.

In accordance with one embodiment of the present invention, a Node Crawler System utilizes a variety of data conduit options to obtain Candidate Node Data for different types of Intermediate Nodes from Source Nodes. The Candidate Node Data may be stored in a Logical Data Repository.

In another embodiment, an Intermediate Node Verification System utilizes Candidate Node Data to generate Node Requests that enable data collected at the Requesting Node and the Responding Node. The collected Requesting Node Data and Responding Node Data are used to analyze and overcome attacks used by harmful Intermediate Nodes. The analysis of the Node data results in information about each Intermediate Node that may be used to determine various features and the relative safety of using a particular Intermediate Node.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements.

DETAILED DESCRIPTION OF THE PRESENTLY PREFERRED EMBODIMENTS

The present invention provides systems and methods for identifying, geo-locating and categorizing Intermediate Nodes 200. This discussion provides a general overview of example embodiments prior to describing each in more detail below.

Figure 2:
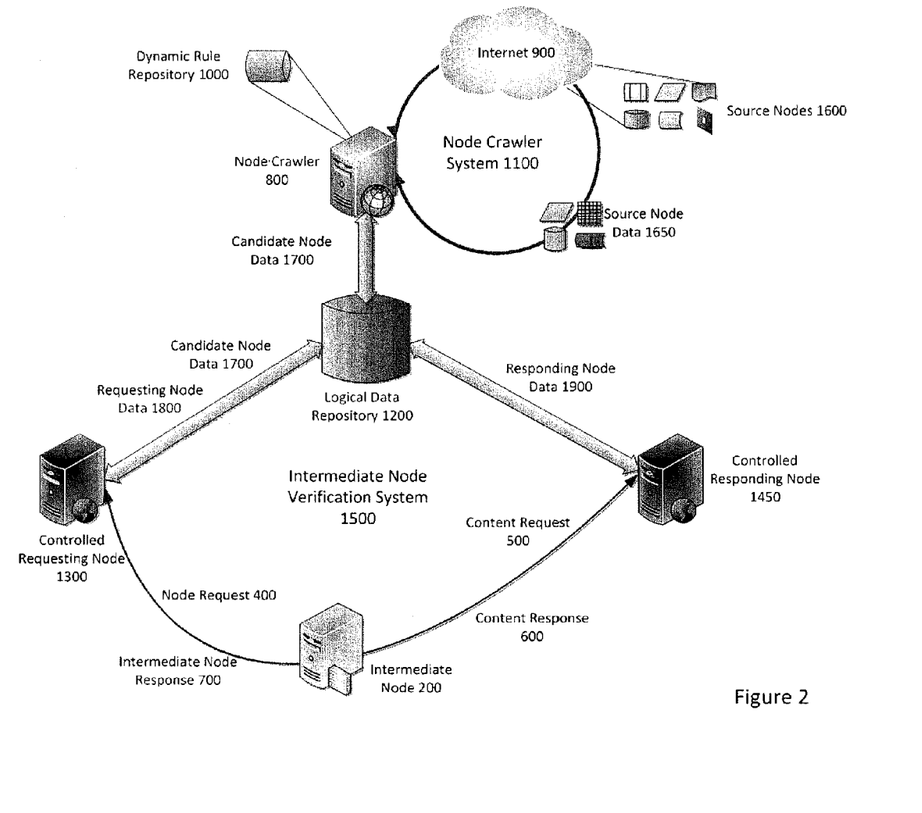
FIG. 2 is a schematic drawing that illustrates a Node Crawler System 1100 and a Node Verification System 1500 according to example embodiments.

FIG. 2 is a schematic drawing that illustrates a Node Crawler System 1100 and a Node Verification System 1500 according to example embodiments.

The Node Crawler System 1100 obtains and submits Candidate Node Data 1700 to a Logical Data Repository 1200. As explained in more detail in subsequent sections below, the Node Crawler System 1100 obtains data through various mechanisms over any type of communication path, using any type of communication, and can either pull Candidate Node Data 1700 from Source Nodes 1600 or receive Candidate Node Data 1700 from Source Nodes 1600.

The Intermediate Node Verification System 1500 utilizes Candidate Node Data 1700 to determine the functionality of Intermediate Nodes 200. The Intermediate Node Verification System 1500 comprises a Controlled Requesting Node 1300 and a Controlled Responding Node 1450 to generate a communication path through a target Intermediate Node 200. Data on the target Intermediate Node 200 is collected at the Controlled Requesting Node 1300 and the Controlled Responding Node 1450. The collected data for the Intermediate Node 200 is used by the Intermediate Node Verification System 1500 to categorize a type of the Intermediate Node 200 and to determine the safety and functional capabilities of the Intermediate Node 200.

Communications between nodes and between nodes and other system elements can occur via any viable means including, but not limited to, wired, wireless, cellular, optical and satellite communications. The communications can occur via the Internet, an Extranet, Intranet or any other network type that provides access through two or more nodes. A mode of the communications is not limited and may include, for example, peer-to-peer, client-server and mainframe architectures.

A. Node Verification System

FIG. 1 shows a system including an Intermediate Node 200 utilized by a Requesting Node 100 to obtain Target Content 300 from a Responding Node 1400. Target Content 300 includes any type or form of data. The Target Content 300 may include text data or binary data or some combination thereof, and may be obtained through any viable means including, for example, Internet Requests, Web Service calls, FTP, SMTP, UDP and TCP.

The Requesting Node 100 sends a Node Request 400 to the Intermediate Node 200 either directly or indirectly through a method such as an HTTP 302 Redirect or a TCP Resend message. After the Intermediate Node 200 receives the Node Request 400, the Intermediate Node 200 may request the Target Content 300 from the Responding Node 1400 through a Content Request 500.

To the Responding Node 1400, the Content Request 500 may look as if it has been sent from the Intermediate Node 200, and the Responding Node 1400 sends the Target Content 300 back to the Intermediate Node 200 via a standard Content Response 600. It should be noted that the Intermediate Node 200, depending on a type of the Intermediate Node 200, may provide identifying information about the Requesting Node 100 to the Responding Node 1400. The Intermediate Node 200 returns the Target Content 300 to the Requesting Node 100 via an Intermediate Node Response 700. This process, including the Node Request 400, the Content Request 500, the Content Response 600 and the Intermediate Node Response 700, may be cached by the Intermediate Node 200, and the Intermediate Node 200 may modify, possibly in a malicious manner, the contents of the Target Content 300 prior to sending the content back to the Requesting Node 100.

As with other nodes, an Intermediate Node 200 is a logical construct that may be physically implemented on the same physical node as the Requesting Node 100 and/or the Responding Node 1400, or on a separate physical node. The Intermediate Node 200 may be physically implemented as a series of Intermediate Nodes 200, an open or closed system of optionally distributed nodes or some variation thereof. Some Intermediate Nodes 200 may provide access in one geographic location and send out Content Requests 500 through one or more geographic locations, all or some of which are different from the geographic location of the access point.

One challenge associated with the conventional use of Intermediate Nodes 200 is that the Requesting Node 100 typically does not have any visibility into the Content Request 500 and the Content Response 600 performed between the Intermediate Node 200 and the Responding Node 1400. This lack of visibility enables certain nefarious Intermediate Nodes 200 to promote services to Requesting Nodes 100 that the Intermediate Nodes 200 may or may not provide. Even if a Requesting Node 100 can determine where an Intermediate Node 200 is located based on information such as a Uniform Resource Indicator (URI) of the Intermediate Node's 200 access point, there is no guarantee that this is the location that a Responding Node 1400 containing the Target Content 300 sees from the Intermediate Node 200. Many Intermediate Nodes 200 use one physical node to accept incoming Node Requests 400 and a completely different node to send out Content Requests 500.

"URI" is an acronym for Universal Resource Identifier and is a term of art used to denote any set of data sufficient to locate a node on a given type of communications. Nodes can support different URI values for different types of communication and URI values can exist across different communication paths and modes. Examples of URI values include IP Addresses, IP Addresses and Ports, URL values, TCP addresses, email address and Domain Name Services (DNS) entries in a DNS Name Server. A Port is an optional value that enables a given node to support different requests, or types of communications, using the same IP address. It should be noted that the above examples of URI values are only a few possible examples of URI values, and the concept of a universal identifier is not limited to these examples.

To overcome the lack of visibility between the Intermediate Node 200 and the Responding Node 1400, as well as other challenges, example embodiments of the present invention provide a Node Crawler System 1100, as shown in FIG. 2, which obtains Candidate Node Data 1700 from Source Nodes 1600. While the schematic drawing in FIG. 2 shows the Node Crawler System 1100 and the Node Verification System 1500 as existing on different nodes, this configuration is presented for sake of clarity. In other example embodiments, the Node Crawler System 1100 and the Node Verification System 1500 exist on the same node or, at the least, on tightly integrated nodes that share some form of memory, e.g., Logical Data Repository 1200.

The Logical Data Repository 1200 is a logical construct that can be physically implemented as shared memory and may be, for example, a memory file, a shared queue, a web service call or a file system storage. The Logical Data Repository 1200 may be a single data management solution or a database, or the Logical Data Repository 1200 may be part of a larger set of repositories either on the same physical node or on separate physical nodes located in various geographical locations. The Node Crawler System 1100, the Logical Data Repository 1200 and the Node Verification System 1500 may be implemented as a single physical node or as three systems of a multitude of nodes or some variation thereof. The arrows showing data flow between various nodes and the Logical Data Repository 1200 in FIG. 2 denote direction of data and do not show or place any restrictions on a number of types of connections thereto. In some example embodiments, a given node sends or receives data from one node within a Logical Data Repository 1200 or from multiple nodes.

Communications with the Logical Data Repository may occur serially or in parallel and may occur across different types of communication and different communication paths, or the communications may occur on a single type of communication or a single type of communication path or any combination thereof. There is no restriction that data flowing in one direction must flow in the other direction using the same communication types or paths. Thus, data may flow from the Logical Data Repository 1200 to a given node using one path, or sets of paths, and utilizing a given type, or types, of communication, and that second node can send data back to the Logical Data Repository 1200 using the same or completely different types and paths of communication. Furthermore, the Logical Data Repository 1200 and a given node can use a single mode of communication or multiple modes of communication, and the modes used can extend over a plurality of communication types and paths.

The Node Crawler System 1100 comprises a set of Source Node 1600 information including at least one target Uniform Resource Identifier (URI). The Source Node 1600 information itself may be stored anywhere, including the Logical Data Repository 1200 and one or more of a plurality of local data stores, text files, XML files, web service sources or any other source in any combination thereof that can return the at least one of a possible plurality of URI values. A given URI points to a Source Node 1600 that is on the same node as the Node Crawler 800 or external to the logical node of the Node Crawler 800. The Source Node 1600 provides Source Node Data 1650 that comprises, for example, text data or binary data or some combination thereof, and can be stored in a structured or unstructured manner.

The Node Crawler 800 obtains the Source Node Data 1650 for a given Source Node 1600 based on a given URI. The Node Crawler 800 may obtain Source Node Data 1650 for each of the Source Nodes 1600 (i.e., the URIs) in the set of source node information or for a portion thereof. The Node Crawler 800 may obtain Source Node Data 1650 for each of the Source Nodes 1600 of a given network or for a portion thereof. The Node Crawler 800 may obtain Source Node Data 1650 for Source Nodes 1600 selected based on web services, applications and/or search results. The Node Crawler 800 may optionally apply rules found in the Dynamic Rule Repository 1000 to extract possible Candidate Node Data 1700 from the Source Node Data 1650. For example, the Node Crawler 800 may iterate through the rules found in the Dynamic Rule Repository to extract the Candidate Node Data 1700 for the given Source Node 1600. Based on the types of Intermediate Nodes 200 being targeted, the actual Candidate Node Data 1700 formats can look considerably disparate in nature.

Figure 3:
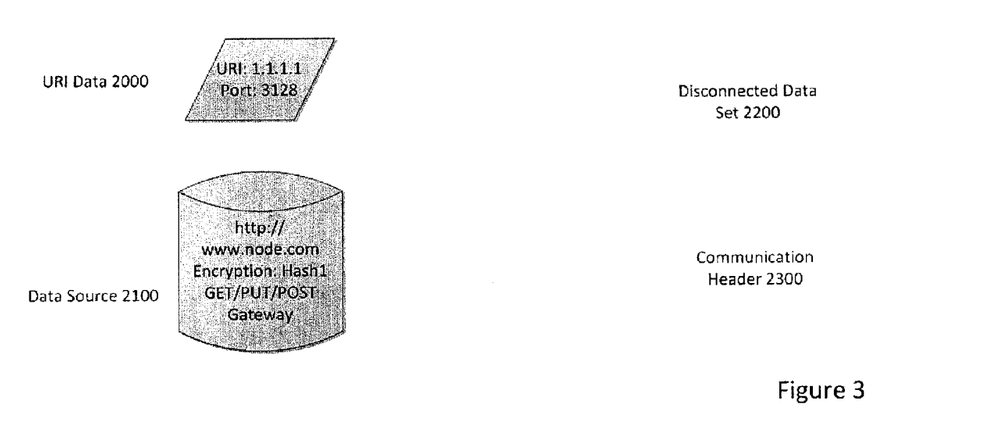
FIG. 3 shows types of Candidate Node Data 1700 according to example embodiments.

For example, as shown in FIG. 3, certain Intermediate Nodes 200 require an IP Address (e.g., 1.1.1.1) along with a port (e.g., 3128) to work properly. Other Intermediate Nodes 200 require a main domain name (e.g., a URL, for example, http://www.myNode.com) to be accessed. Still other types of Intermediate Nodes 200 have specific naming conventions that apply only to the network in which they operate. Some Candidate Node Data 1700 is comprised of Communication Headers 2300, e.g., TCP header data or HTTP header information. The Candidate Node Data 1700 may be in the form of a Disconnected Data Set 2200, URI Data 2000 that is optionally extracted from text, HTML or other such content, or Data Sources 2100, e.g., federated queried data, replicated data, encapsulated or transportable databases, text repositories or files, XML data or other sets of relational or non-relational data or other such data forms that contain sufficient data to access and utilize a given Intermediate Node 200.

Some Intermediate Nodes 200 require authentication information or various types and/or layers of encryption whereas others require a workflow process for ongoing interactions. Still other intermediate nodes provide different services based on varying configurations. All of these optional information features combine to create multiple optional formats of Candidate Node Data 1700.

Figure 5:
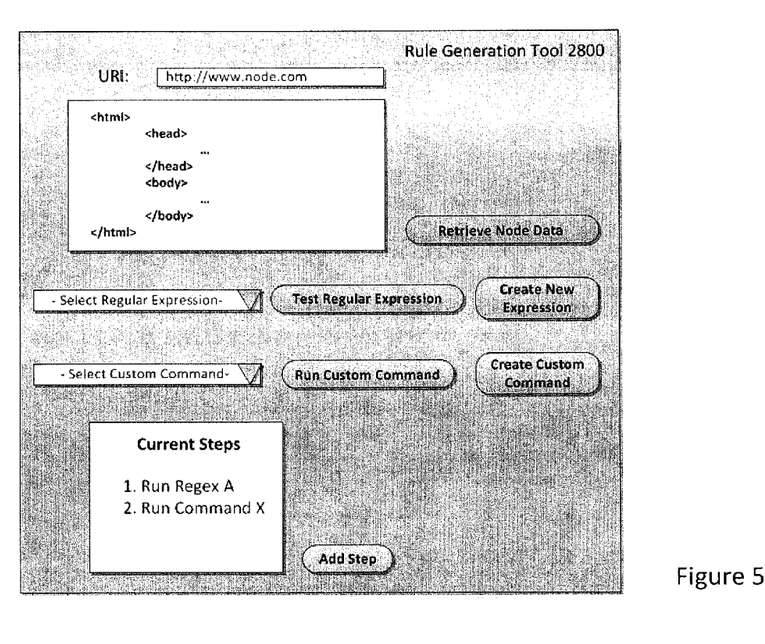
FIG. 5 is a schematic drawing of an optional Rule Generation Tool 2800 according to an example embodiment.

Given this range of possible Candidate Node Data 1700, the Node Crawler 800 may employ a dynamic set of rules which are iterated through in an effort to obtain possible candidate matches. The Dynamic Rule Repository 1000 may contain rules containing any commands that are viable for extracting data from Source Node Data 1650 to create the Candidate Node Data 1700. In one embodiment, two types of commands are used for extracting data: Regular Expressions and Custom Commands. Regular Expressions refer to a term of art describing a well-established syntax and language for providing series of commands that are used to pattern match a phrase or series of characters in any set of data. There are well-known Regular Expression libraries and processors that provide an extremely flexible array of matching options. In one embodiment, as shown in FIG. 5, an administrative tool provides an ability to manually test and enter Regular Expression patterns into the Dynamic Rule Repository 1000 for subsequent use.

When Regular Expressions are not sufficient, or when multiple Regular Expressions are required to be applied in a certain manner, the Node Crawler 800 may employ Custom Commands. Custom Commands perform operations including, for example, Binary/Text Search and Replace; Binary/Text Bidirectional Conversions; Bitwise Comparison Operations; Expression/Command Workflow, Web Browser Emulation, Scripting Engine Methods and Language Translation processes. In another embodiment, the Custom Commands are stored as workflow processes which are themselves iterated through for each Source Node Data 1650 being processed. The individual Regular Expressions, Custom Commands and Workflows are stored in the Dynamic Rule Repository 1000 as rules.

The Dynamic Rule Repository 1000 itself is a logical node construct and, as such, may exist within the same memory space as the Node Crawler 800 or in a separate physical location, or some combination of the two, and may be comprised of multiple physical implementation options ranging from a portion of memory utilized by the Node Crawler 800 to a completely distributed system spread across a range of geographic regions. The Dynamic Rule Repository 1000 may store rules in a permanent manner, a transient manner or some combination thereof.

As a further example, in one embodiment the Dynamic Rule Repository may be encapsulated in a series of Dynamic Link Libraries (DLL) files that are utilized by the Node Crawler 800 through a series of binary requests. In this embodiment, the logic, steps and options are built into the DLL files and treated as a discrete functional block by the Node Crawler 800. In this embodiment, proven techniques and rules might be used without a dynamic learning component for speed optimization purposes.

Rules may be generated through an optional Rule Generation Tool 2800 as shown in FIG. 5, wherein end users can manually create rules and store the created rules in the Dynamic Rule Repository 1000. The end users may enter a URI and obtain Source Node Data 1650 which may appear as, but is not limited to, text or may be binary data such as audio/video or a TCP data stream. The end user may apply various expressions and commands against the Source Node Data 1650 until the desired Candidate Node Data 1700 has been extracted therefrom. The custom commands include branching, saving and other such options to allow a single set of Source Node Data 1650 to be parsed in various manners to extract different Candidate Node Data 1700 formats as needed.

The rules may be combined with rules obtained in a dynamic manner and transiently stored. In an example embodiment, a given set of Source Node Data 1650 is inspected for URI values using predefined rules while the underlying TCP communications is parsed for TCP Header information leading to transient rules for accessing particular Source Nodes 1600.

The Node Crawler 800, after it has obtained the Source Node Data 1650 from a Source Node 1600 via a given URI, may successively iterate through the available rules. In one embodiment, all available rules are applied to every content instance to obtain as many matches as possible. In another embodiment, the remainder of the rules, after a first rule which obtains Candidate Node Data 1700 is utilized, are not applied, and that successful rule may be stored for subsequent content retrievals from that URI or URIs related to that URI. If a previously successful match fails to produce candidates in the subsequent content retrievals, the other patterns may be iterated through.

In still another further embodiment, rules are iterated through in a successive series of steps and automatically chained together to form increasingly complex processing logic. The rules may be basic rules focused on obtaining general components of information or removing nonessential pieces of data. For example, a rule for finding IP Addresses and Ports might remove all letters and HTML punctuation from the Source Node Data 1650. Other possible rules may include rules for transforming strings into string arrays based on a variable set of delimiters, and yet other rules may only extract specific IP addresses or numbers. The Node Crawler 800 may iterate through the rules to progressively filter out content until the desired IP Address and Ports are obtained. Successive iterations generate subsequent steps in a dynamically determined workflow for the Source Node Data 1650.

Client-side scripting libraries, code components, methods, DLLs or embedded code, amongst other options, may be used to parse incoming content including the Source Node Data 1650. A goal of example embodiments may be to process incoming content such that the end result is similar to or exactly the same as what is presented through a standard web browser, e.g., Internet Explorer, Firefox or Chrome. Examples of client side scripting include, for example, Java-Script, VB Script, Action Script and AJAX. An example embodiment may include multiple request support to further load such features as images, iFrame/framed-in or layered content or any other synchronous/asynchronous or additional content that would be retrieved by a web browser for a given request.

The Node Crawler 800 according to another embodiment utilizes image recognition software, matching technology or a manual matching process to transform images into text equivalents. For example, a given Data Source Node 1600 may provide a series of images representing port numbers as Source Node Data 1650. In this case, the Rule Generation Tool 2800 shown in FIG. 5 may be utilized to enable a user to provide the text contained by the image as a new rule. The Node Crawler 800 uses the rule to transform matching images into usable port numbers for Candidate Node Data 1700.

Each time the Node Crawler 800 obtains the Candidate Node Data 1700 for a particular Source Node 1600, the data for the particular Source Node 1600 (e.g., an Intermediate Node 200) corresponding thereto is sent to the Logical Data Repository 1200. The Candidate Node Data 1700 provides sufficient information to interact with a given node, but it is not restricted to only Intermediate Nodes 200. The Node Crawler System 1100 may extract Candidate Node Data 1700 for each Source Node Data 1650/Source Node 1600 and send the extracted data for each Source Node 1600 to the Logical Data Repository 1200.

The Node Crawler System 1100 may directly utilize the Candidate Node Data 1700 without subsequent processing through a separate node from the Logical Data Repository 1200. In a further embodiment, the Node Crawler System 1100 may be run on a given network to identify all physical devices connected to that network. The Source Node Data 1650 in this case may include computer specifications, for example, operating system information, hardware information, accessible ports and location within the network. The Node Crawler System 1100 according to this embodiment may be utilized to dynamically determine all nodes within the network and properly categorize each node in turn. As a still further embodiment, each identified logical node may be further inspected by the Node Crawler System 1100 until all physical instances for each logical node have been defined and extracted as Candidate Node Data 1700.

Figure 4:
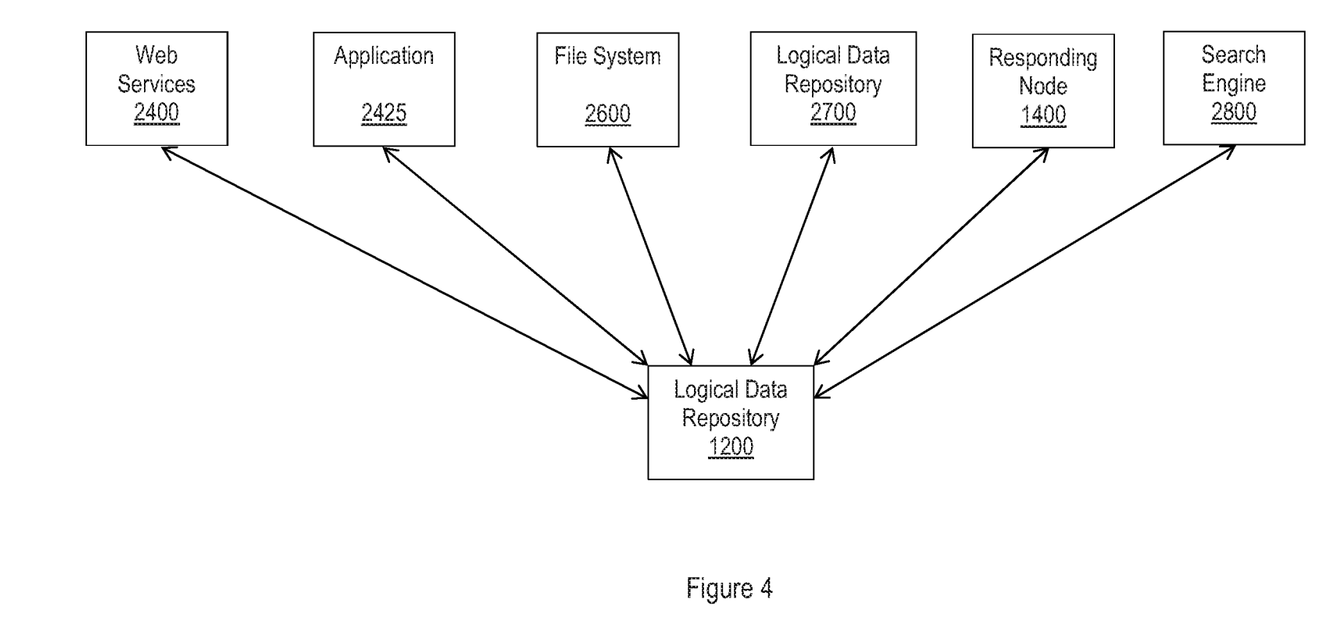
FIG. 4 is a schematic drawing showing input options for Candidate Node Data 1700 into a Logical Data Repository 1200 according to example embodiments.

The Node Crawler System 1100 may obtain Candidate Node Data 1700 in multiple different formats, as shown in FIG. 4. Source Nodes 1600 may be of any type of node and can transmit Source Node Data 1650 to the Node Crawler System 1100 or be polled for said data. In some example embodiments, Web Services 2400 or Applications 2500 are used to send Source Node Data 1650, or even Candidate Node Data 1700, directly to the Node Crawler System 1100. This data may already be parsed into the requisite Candidate Node Data 1700, or need to be parsed and/or transformed accordingly. The data may be complete or incomplete with rules being utilized to fill in missing components of data as required. In further embodiments, search engines may be utilized directly or indirectly through screen-scraping, API, web services or other such access to search and return results to the Node Crawler System 1100. Search terms used in the search engine processes may be entered by users, obtained from other crawling efforts or derived from prior search efforts.

Data may be extracted by the Web Crawler 800 from any type of node including, for example, File Systems 2600, local, remote, federated or distributed Logical Data Repositories 2700 or from any Responding Node 1400. Data may be entered into the Node Crawler System 1100 or directly into the Logical Data Repository 1200 through any of these options or through any integration layer, e.g., data integration, business layer options and presentation layer features (e.g., scraping, mash-up technology or similar options).

B. Intermediate Node Verification System

Referring again to FIG. 2, the Intermediate Node Verification System 1500 utilizes Candidate Node Data 1700 to test whether a given node is an Intermediate Node 200 and, if so, to determine a type of the Intermediate Node 200 and the capabilities of the Intermediate Node 200 as well as the potential impact that using the node might have on a Requesting Node 100.

The Intermediate Node Verification System 1500 uses a Requesting Node 100 in a controlled manner to initiate this testing and determination process. Control of the Requesting Node 100, i.e., Controlled Requesting Node 1300, is obtained by, for example, hardware which interacts with all communications from a given device; an external communications option, e.g., a firewall; or utilizing software, code components or services on a node that interact with all communications for a given test. It should be noted that the Controlled Requesting Node 1300 does not need a component that interacts with all communications, although the Controlled Requesting Node 1300 can interact with all communications in some embodiments. Rather, the Controlled Requesting Node 1300 need only be able to target communications for a given test of an Intermediate Node 200. The target communications are defined in more detail below.

The Controlled Requesting Node 1300 is configured such that the Intermediate Node Verification System 1500 can use the Candidate Node Data 1700 to generate a Node Request 400 from the Controlled Requesting Node 1300. The Intermediate Node Verification System 1500 may further obtain and store the Intermediate Node Response 700. Any combination of the Node Request 400, the Intermediate Node Response 700 and optional tests run on the logical Controlled Requesting Node 1300 are collectively referred to as Requesting Node Data 1800.

The Controlled Requesting Node 1300 may be any Requesting Node 100. In an example embodiment, the Controlled Requesting Node 1300 is a process in the same physical server as the Node Crawler 800. In other embodiments, the Node Crawler 800 is a system comprised on multiple nodes, and the Controlled Requesting Node 1300 is, itself, in a completely separate system.

The Controlled Requesting Node 1300 sends a Node Request 400 for Target Content 300 to a Controlled Responding Node 1450 based on the Candidate Node Data 1700 for the Intermediate Node 200 to be tested. The Controlled Responding Node 1450 may be any logical node that contains the Target Content 300. Control of the Responding Node 1400, i.e., Controlled Responding Node 1450, is obtained by, for example, hardware which interacts with all communications from a given device; an external communications option, e.g., a firewall; or utilizing software, code components or services on a node that interact with all communications for a given test. It should be noted that the Controlled Responding Node 1450 does not need a component that interacts with all communications, although the Controlled Responding Node 1450 can interact with all communications in some example embodiments. Rather the Controlled Responding Node 1450 need only be able to interact with target communications for a given test of an Intermediate Node 200.

In one embodiment, the Content Request 500 and the Content Response 600 are stored for each test of the Intermediate Nodes 200 in the Logical Data Repository 1200. In another embodiment, local tests are run on the Controlled Responding Node 1450 and the results of the local tests are combined with the Content Request 500 and Content Response 600. Any combination of this data is referred to as Responding Node Data 1900 for the purposes of this discussion.

Depending on the requirements of a given embodiment, the Controlled Requesting Node 1300 may iterate through a series of tests to determine desired functionality and safety-related data of the Intermediate Node 200. For example, different types of communication may be attempted by the Controlled Requesting Node 1300—including, for example, using different types of communication standards (i.e. HTTP 1.0 vs. HTTP 1.1), different TCP commands (Put, Get, Post) and different HTTP/TCP Header values. These different types of communication attempts, along with the various types of Target Content 300 being retrieved, enable the Intermediate Node Verification System 1500 to determine the functionality available for a given Intermediate Node 200. For example, if a Node Request 400 using an HTTP 1.1 GET commands for streaming media returns valid results, the capabilities of this Intermediate Node 200 required for returning such results are discernible.

According to another embodiment, the Controlled Requesting Node 1300 includes static values in the Node Request 400 from the Controlled Requesting Node 1300 that are optionally checked or utilized in some manner at the Controlled Responding Node 1450. A further embodiment of the Node Verification System 1500 returns the static values via the Content Response 600 and/or adds in new static values into the Content Response 600. For example, the Controlled Requesting Node 1300 might include a static identifier in a Node Request 400. The static identifier may be a globally-unique identifier, a checksum value of the content being sent or some other value therein. The value itself may be included in any part of the Node Request 400 including, but not limited to, the TCP Header, HTTP Header or TCP/HTTP message, or it may be transmitted via a separate channel depending on the embodiment. The Controlled Responding Node 1450 may look for this value as a check on content safety and may, in turn, return a related identifier or new static values. The Controlled Requesting Node 1300 may look for the related identifier or new static values as a check on content safety.

In one embodiment, the Controlled Responding Node 1450 adds scripts, values or pieces of code to determine what the Intermediate Node 200 is filtering during transmission. For example, if a client-side script is statically added, the Controlled Requesting Node 1300 can look for this script in the Node Request 400. If the script is missing, the Node Verification System 1500 may determine that the Intermediate Node 200 does not support scripting. Static values can be determined using configuration settings, be generated by an end user terminal directly in the Logical Data Repository 1200, or as part of an end user program running on the Controlled Requesting Node 1300 or result from rules applied against the Candidate Node Data 1700.

Further embodiments of the Node Verification System 1500 perform multiple Node Requests 400 serially or in parallel to determine if the Intermediate Node 200 changes behavior from request to request or to determine the amount of traffic a given Intermediate Node 200 can support. In another embodiment, the Node Verification System 1500 requests different types of data including text data or binary data or combinations thereof to determine whether the Intermediate Node 200 supports such data.

In a further embodiment, the Node Verification System 1500 utilizes a known set of data sent from the Controlled Responding Node 1450 to the Controlled Requesting Node 1300 to discern extra content inserted by the Intermediate Node 200. For example, if a given Intermediate Node 200 embeds the data from the Controlled Responding Node 1450 in a given TCP package field or nests the data in a given HTML element, the Node Verification System 1500 can utilize manual text inspection, Regex Expressions, workflow processes or other similar techniques to discern how the data from the Controlled Responding Node 1450 is being included in the overall Content Response 600 from the Intermediate Node 200.

In an another embodiment, being able to discern how the data from the Controlled Responding Node 1450 is encapsulated in a given Content Response 600 can enable the safe use of any otherwise unsafe Intermediate Node 200. In an another embodiment, the Node Verification System 1500 can either capture the static versions of data inserted by the Intermediate Node 200 or the Node Verification System 1500 can capture basic framing elements that wrap inserted data. As an example, if an HTTP Header packet contains specific values from the Intermediate Node 200, those values can be statically obtained and stored in places such as the Logical Data Repository 1200. As another possible example, if the Node Verification System 1500 discerns that extra HTML was inserted into a Content Response 600, the system might look for framing elements such as, but not limited to, table, body, div, span, p, li or input tags. By capturing these types of tags that sit at the beginning and end of inserted content, subsequent processes might be able to strip out the inserted content regardless of the dynamic nature of this inserted content.

The use of this optionally extracted data is not part of the Node Verification System 1500 in this embodiment. Rather this embodiment provides an example of how data from the Controlled Requesting Node 1450 can be used to discern inserted content and optionally store said data in places such as the Logical Data Repository 1500. That data can then, in other embodiments, be used to safely interact with Intermediate Nodes 200 that would be otherwise unsafe to use or would fail business rules such as, for example, preventing ads from appearing on a user's browser.

C. Node Verification Process

An Intermediate Node Verification Process begins with the Controlled Requesting Node 1300 sending a Node Request 400 to Controlled Responding Node 1450 based on the Candidate Node Data 1700 of the Intermediate Node 200 to be tested. The Intermediate Node 200, if functional, receives the Node Request 400 and sends a Content Request 500 to the Controlled Responding Node 1450. The Controlled Responding Node 1450 optionally stores the Content Request 500 and then sends a known Content Response 600 back to the Intermediate Node 200 candidate. The Controlled Responding Node 1450 may send the Responding Node Data 1900 to the Logical Data Repository 1200. If the Candidate Node Data 1700 points to a node that is not an Intermediate Node 200, the Node Request 400 will fail and the node will not be categorized as an Intermediate Node 200. Alternative example embodiments of the Node Verification System 1500 may run additional tests to determine functionality of the nodes determined as non-Intermediate Nodes.

In an alternative embodiment, the Controlled Responding Node 1450 creates contextual Content Responses 600, which include content related to the incoming request, and stores nothing. In another embodiment, the Controlled Requesting Node 1300 and Controlled Responding Node 1450 directly communicate some combination of Requesting Node Data 1800 and Responding Node Data 1900 through any available communication type or path. In another embodiment, the Controlled Requesting Node 1300 sends out Node Requests 400 but stores no information. And in another embodiment, in which node connectivity and throughput are tested, the content of the requests and responses from the Controlled Requesting Node 1300, the Intermediate Node 200 and the Controlled Responding Node 1450 are ignored and, instead transmission times, amongst other options are utilized to determine functionality and characteristics of the Intermediate Node 200.

If the Intermediate Node 200 is a viable intermediate node, the Intermediate Node 200 sends an Intermediate Node Response 700 back to the Controlled Requesting Node 1300. In one embodiment, this process is optionally repeated across different communication types, paths and modes as well as Target Content 300 types and optionally repeated more than one time.

Each Intermediate Node Response 700 message may be stored and inspected for static values being sent from the Controlled Responding Node 1450. Intermediate Node Responses 700 not matching known Content Responses 600 indicate that the content returned from the Intermediate Node 200 is being modified by the Intermediate Node 200. Various checks for known scripts, tracking mechanisms and additional header values may be performed, and the system may use the tested Intermediate Nodes 200 despite the modifications depending on a type of the system.

For example, the Intermediate Node Verification System 1500 may utilize checksum values to determine if network communications are being tampered with by the Intermediate Node 200. In a representative embodiment, the Controlled Requesting Node 1300 sends out a static Node Request 400 through an Intermediate Node 200 to a Controlled Responding Node 1450. Because the Intermediate Node 200 can be any network device including, but not limited to, routers, repeaters and bridges, this configuration utilizing checksum values is ideal for identifying corrupted messages indicative of network tampering. The Controlled Responding Node 1450 performs a checksum on the received Content Request 500 and compares that value to an optionally encrypted checksum value sent from the Controlled Requesting Node 1300 either in the same message or as a separate, direct communication or even an indirect sharing of data as previously described. If the checksum values are different, the message is determined to have been modified. The same process can be performed and occur in the reverse with messages going from the Controlled Responding Node 1450 to the Controlled Requesting Node 1300, and the two nodes can switch position such that the requesting node becomes the responding node and vice versa.

In another embodiment, the Content Response 600 might be one of a plurality of possible responses that are optionally stored on both the Controlled Requesting Node 1300 and the Controlled Responding Node 1450. In a further embodiment, the index or unique identifier for a specific Content Response 600, optionally encrypted, can be included in the Content Response 600. In another embodiment, the two nodes might have an independent direct communications channel separate from the Intermediate Node 200 through which identifiers, checksums, Content Responses 600 or other information can be exchanged sufficient for the Requesting Node 1300 to discern what Content Response 600 was sent to the Intermediate Node 200. Utilizing a plurality of possible Content Responses 600 enables optional dynamic content checks, Intermediate Node 200 caching issues and optionally helps to obfuscate testing patterns.

According to one embodiment of the Node Verification System 1500, any modifications to the Content Responses 600 may be sufficient to mark the Intermediate Node 200 as dangerous or nonviable and to exclude said Intermediate Node 200 from subsequent usage. Other example embodiments may run further tests to determine the extent of modifications and whether said modifications occur across types, paths and modes of communication, before marking the Intermediate Node 200 as dangerous or nonviable. Further embodiments, as described previously, might look for mechanisms to enable safe usage of otherwise unsafe Intermediate Nodes 200.

In one embodiment, upon completion of the various request cycles, the Controlled Requesting Node 1300 may then inspect the Content Requests 500 made by the Intermediate Node 200. In other example embodiments, the inspection is performed by the Controlled Responding Node 1450, by another application, program or system outside of the logical nodes in the Intermediate Node Verification System 1500 or some combination thereof wherein communications are utilized to distribute processes across internal and external nodes.

In an example embodiment, inspecting various TCP and/or HTTP fields, which are evident to any person of sufficient technical skill, may aid in determining the Intermediate Node's 200 presence, the Controlled Requesting Node's 1450 identity and the location from which Content Requests 500 were sent. By comparing these values to the values of the other Content Requests 500, in an example further embodiment, the Node Verification Process determines if a single Intermediate Node 200 is a conduit to more than one Intermediate Node 200 on the outbound side. Further example embodiments of the Node Verification System 1500 determine differences in requests and identity information to determine the type of Intermediate Node 200 and privacy level thereof. For example, some Intermediate Nodes 200 share the Requesting Node's 100 information while others completely hide such information.

In further embodiments, test cycles are repeated to determine changes in Intermediate Node 200 functionality over time. Still further embodiments additionally repeat tests across communication types, paths and modes to categorize a range of Intermediate Node 200 functionality. For example, a given Intermediate Node 200 may successfully transmit HTML-based content but fail to transmit audio or video content. In such a case, the Intermediate Node 200 may be considered to support standard HTML content but not support multimedia content. Other example embodiments will continuously perform tests, or perform tests at periodic intervals to maintain current data on each Intermediate Node 200.

By utilizing the information on both sides of the Intermediate Node 200, the Intermediate Node Verification System 1500 is able to determine what the Intermediate Node 200 is actually doing as opposed to what it states it is doing, thereby enabling systems and methods according to example embodiments to identify and properly categorize each type of Intermediate Node 200 along with its list of capabilities.

Figure 6:
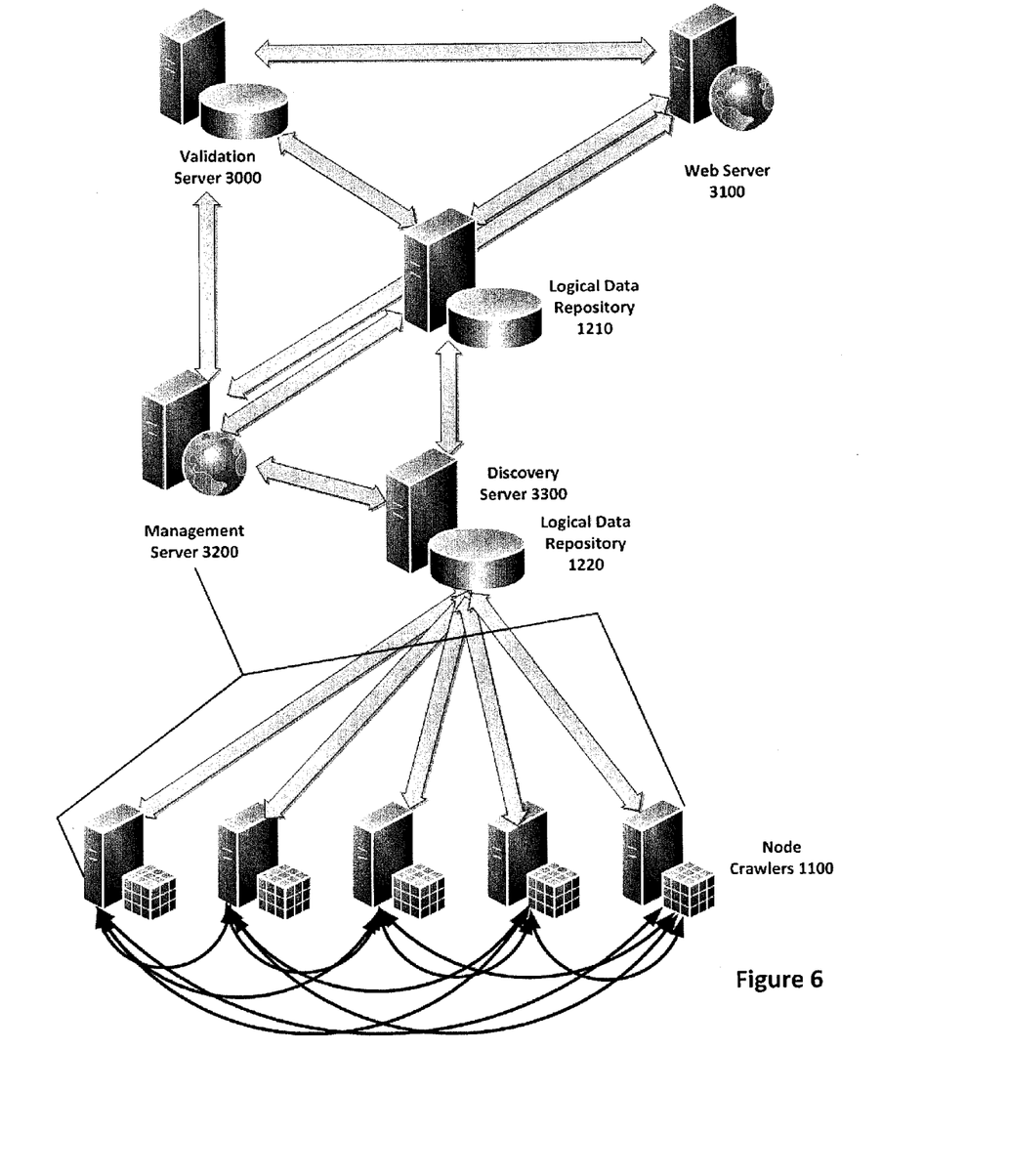
FIG. 6 is a schematic drawing demonstrating further logical node constructs of the Node Crawler System 1100 and the Intermediate Node Verification System 1500 according to example embodiments.

FIG. 6 provides further logical node constructs in the Node Crawler System 1100 and the Intermediate Node Verification System 1500 (see FIG. 2). In this embodiment, the Node Crawler 1100 is actually comprised of n-number physical systems that each run an independent crawling process or processes. In an embodiment, these Node Crawlers 1100 store any found results in a local logical repository and then that repository's data is retrieved by the Logical Data Repository 1220. In another embodiment, the Node Crawlers 1100 send their collected data directly to the Logical Data Repository but can still optionally store some or all of their collected data in local logical data repositories. In a further embodiment there can exist a mix of Node Crawlers such that some utilize local logical data repositories and others can send data directly to other Crawler Nodes 1100 or the Logical Data Repository 1220.

As a further embodiment, the Node Crawlers 1100 can further use either rules-based processing as described previously, external libraries or components or some combination therein to extract values from the incoming Source Node Data 1650. Depending on the specific embodiment, Node Crawlers 1100 might process the incoming data as it is received, they may cache the data for later processing or they may utilize a hybrid approach wherein data is processed as it is received unless the server load is to great—at which time the data is cached for later parsing. Further, the Candidate Node Data 1700 extraction process might be relegated to the Logical Data Repository 1220 exclusively or through a distributed process wherein certain components run on the Node Crawler 1100, such as external library calls, and other components, such as workflow processing, occur on the Logical Data Repository 1220 Node.

In a possible embodiment, with reference to FIG. 2 and as shown in FIG. 6, the Logical Data Repository 1220 Node is a physical device that accepts in Candidate Node Data 1700 and can send out data to the Crawler Nodes 1100. This latter process, in a further set of optional embodiments might be used to change global configuration settings in a specific Node Crawler 1100 including, but not limited to, processor usage, memory consumption and network bandwidth limits. These changes might be direct modifications or indirect through mechanism such as the degree of parallelism allowed in a given Node Crawler 1100. Further the Logical Data Repository 1220, depending on the embodiment, might update locally-stored data on a given Node Crawler 100 which optionally modifies the behavior of that Node Crawler 1100.

As an illustrative example, the Logical Data Repository might be configured such that the main domain of a website is stored in a parent table called Domains which has a child table called Pages. The Pages table, in turn, could optionally be a parent to a child table called Results. In the Results table, in an embodiment, bitwise flags could be utilized to determine if a given result in a valid Intermediate Node 200 or not. Subsequent processing, depending on the embodiment, might then analyze the good and bad Results and determine that a given page in the Pages table is not producing any valid results. For example, a process might determine that a given page generated 10,000 results over a certain period of time but that none of those Results were valid. If that period of time crosses a threshold of allowable time to produce valid Candidate Node Data 1700 then the page itself may optionally be marked as Bad.

A further embodiment might then utilize a process to look at every Page within a Domain and see if any of the pages remain valid. In an optional embodiment, the inability to produce a valid page over some configurable amount of time might lead the system to mark the Domain as invalid/do not crawl. This process might run on each specific Node Crawler 1100 locally, it might run as a system across all Node Crawlers 1100 but still distributed just on those crawlers; it might run directly on the Logical Data Repository 1220 with the data from the Logical Data Repository 1220 directly and being polled and updated directly on the Node Crawlers 100. Further, an optional embodiment might utilize an independent system, service, application or such mechanism running completely independently to determine these values. As shown in FIG. 6, this type of processing may occur in the Management Server 3200.

The Logical Data Repository 1220, in a given embodiment, might then provide data to a range of nodes as shown in FIG. 6. In a given embodiment, the Management Server 3200 might monitor the data in the Logical Data Repository 1220 in order to determine when to launch actions such as data migration between nodes, setting flags as described previously or alerting other nodes to start their data-related processes. The Logical Data Repository 1220 might share all or part of its stored data with the Logical Data Repository 1210. This shows the demarcation between a physical implementation and the logical node construct. The two nodes might collectively encapsulate all of the Logical Data Repository 1200 or they might be part of a distributed system that includes database servers found on the Node Crawlers 1100, the Discovery Server 3300's database as well as the Validation Server 3000's local data repository.

While the Discovery Server 3300 hosts the Intermediate Node Verification System 1500 in a specific embodiment, FIG. 6 actually shows how this logical process can be implemented and extended across two physical devices. The Discovery Server 3300, in accordance with this example embodiment, would provide the first test and determine the viability of a given URI as an Intermediate Node 200. The Validation Server 3000, on the other hand, might perform a different level of inspection but perform that level on a regular or even continuous basis. This latter processing might perform a less intensive checking process or it might use a combination of the full Intermediate Node Verification System 1500's process with a lighter verification approach in response to speed and load demands. By dividing the logical Node Verification System 1500 process across multiple physical devices, the Intermediate Nodes 200 can be initially verified and then regularly, irregularly or continuously verified to overcome modifications over time.

Thus, while there have been shown and described and pointed out fundamental novel features of the present invention as applied to preferred embodiments thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A system for identifying and categorizing intermediate nodes based on obtained intermediate node data, the system comprising:
    a node configured to initiate resource requests based on a set of rules through a controlled requesting subsystem;
    a memory configured to store data from the controlled requesting subsystem;
    wherein the controlled requesting subsystem further comprises:
        at least one system node configured to obtain intermediate node data of at least one intermediate node, to apply a plurality of rules comprising at least one custom expression command to the intermediate node data to extract candidate node data from the intermediate node data, wherein the custom expression command comprises a workflow process that is iteratively applied to the intermediate node data of the at least one intermediate node;
        a controlled requesting node configured to test the intermediate node by generating at least one node request to a controlled responding node for target content based on the candidate node data of the at least one intermediate node, wherein the requesting and responding nodes represent endpoints of the node that initiates resource requests; and wherein the system node is further configured to determine if the intermediate node changes a behavior in response to the at least one node request; and wherein the system node both categorizes a type of the intermediate node and determines a safety or functional capability of the intermediate node based on requesting node data collected by the controlled requesting node as a result of the test, including the determination of whether the intermediate node behavior changes in response to the at least one node request, and the candidate node data.

2. The system of claim 1, wherein the at least one system node comprises the memory which stores the candidate node data.

3. The system of claim 1, further comprising at least one other node external to the at least one system node, the at least one other node comprising the logical data repository which stores the candidate node data.

4. The system of claim 1, wherein the at least one intermediate node is a plurality of intermediate nodes.

5. The system of claim 4, further comprising a set of intermediate node information including at least one Uniform Resource Identifier (URI), wherein the at least one URI points to a corresponding intermediate node of the plurality of intermediate nodes, and the at least one system node obtains the intermediate node data for the corresponding intermediate node based on the at least one URI.

6. The system of claim 1, wherein the plurality of rules are selected from the group consisting of: regular expressions, publically available processing sources, WebKit sources and combinations of any of the foregoing.

7. The system of claim 6, wherein the at least one system node iteratively applies at least a portion of the plurality of rules to the intermediate node data of the at least one node to extract the candidate node data from the intermediate node data.

8. The system of claim 6, wherein the plurality of rules are configured to extract candidate node data having a plurality of different formats.

9. The system of claim 1, wherein the plurality of rules comprise at least one regular expression command.

10. The system of claim 6, further comprising a rule generation tool configured to create rules based on input from a user and store the created rules in the dynamic rule repository.

11. The system of claim 6, wherein, after a first rule is applied which successfully obtains candidate node data from the intermediate node data of the at least one intermediate node, the at least one system node does not apply the remainder of the plurality of rules to the intermediate node data of the at least one intermediate node.

12. The system of claim 6, wherein the at least one system node applies the plurality of rules by successively iterating through the plurality of rules in increasing complex logic to progressively filter content from the intermediate node data until a desired level of the candidate node data is obtained.

13. The system of claim 1, wherein the at least one intermediate node is a plurality of intermediate nodes of a given network, and the at least one system node is configured to apply the at least one rule to the intermediate node data of each of the plurality of intermediate nodes of the given network to extract candidate node data for each said node of the given network, and send the candidate node data for each said node of the given network to the logical data repository.

14. A method for obtaining and storing node data, and for identifying and categorizing intermediate nodes based on the node data the method comprising:

obtaining, by at least one system node, intermediate node data of at least one intermediate node;

applying, by the at least one system node, a plurality of rules comprising at least one custom expression command to the intermediate node data to extract candidate node data from the intermediate node data, wherein the custom expression command comprises a workflow process that is iteratively applied to the intermediate node data of the at least one intermediate node; and sending and storing, by the at least one system node, the candidate node data to a logical data repository;

storing, by the logical data repository, candidate node data for at least one intermediate node;

testing the intermediate node by generating, by a controlled requesting node, at least one node request to a controlled responding node for target content based on the candidate node data of the at least one intermediate node;

determining, by at least one system node, if the intermediate node changes behavior in response to the at least one node request; and categorizing, by the at least one system node, a type of the intermediate node and determining a safety or functional capability of the intermediate node, both the categorizing and the determining being based on requesting node data collected by the controlled requesting node as a result of testing the intermediate node, including the determination of whether the intermediate node behavior changes in response to the at least one node request, and the candidate node data.

15. The method of claim 14, further comprising storing, by the logical data repository, the candidate node data in the at least one system node.

16. The method of claim 14, further comprising storing, by the logical data repository, the candidate node data in at least one other node external to the at least one system node.

17. The method of claim 14, wherein the at least one intermediate node is a plurality of intermediate nodes.

18. The method of claim 17, further comprising reading, by the at least one system node, a set of intermediate node information including at least one Uniform Resource Identifier (URI), wherein the at least one URI points to a corresponding intermediate node of the plurality of intermediate nodes, and the intermediate node data for the corresponding source node is obtained by the at least one system node based on the at least one URI.

19. The method of claim 14, wherein the plurality of rules is stored by a dynamic rule repository.

20. The method of claim 19, further comprising iteratively applying, by the at least one system node, at least a portion of the plurality of rules to the intermediate node data of the at least one node to extract the candidate node data from the intermediate node data.

21. The method of claim 19, wherein the plurality of rules extract candidate node data having a plurality of different formats.

22. The method of claim 19, wherein the plurality of rules comprise at least one regular expression command.

23. The method of claim 19, further comprising creating, by a rule generation tool, rules based on input from a user and storing the created rules in the dynamic rule repository.

24. The method of claim 19, wherein, after a first rule is applied which successfully obtains candidate node data from the intermediate node data of the at least one intermediate node, the at least one system node does not apply the remainder of the plurality of rules to the intermediate node data of the at least one intermediate node.

25. The method of claim 19, further comprising applying, by the at least one system node, the plurality of rules by successively iterating through the plurality of rules in increasing complex logic to progressively filter content from the intermediate node data until a desired level of the candidate node data is obtained.

26. The method of claim 14, wherein the at least one intermediate node is a plurality of intermediate nodes of a given network, and the at least one rule is applied to the intermediate node data of each of the plurality of intermediate nodes of the given network to extract candidate node data for each said node of the given network, and the candidate node data for each said node of the given network is sent to the logical data repository.

27. The method of claim 14, wherein the at least one system node comprises at least one of the logical data repository, the controlled requesting node and the controlled responding node.

28. The method of claim 14, further comprising:
generating, by the controlled requesting node, a plurality of node requests to the controlled responding node for target content based on the candidate node data of the at least one intermediate node, wherein a communication type of each of the plurality of node requests is different; and
determining, by the at least one system node, one or more communication types supported by the intermediate node based on the plurality of node requests.

29. The method of claim 14, further comprising:
including, by the controlled requesting node, one or more static values in the node request;
receiving, by the controlled responding node, a content request from the intermediate node based on the node request; and
checking, by the controlled responding node, the one or more static values in the content request to determine a functionality of the intermediate node.

30. The method of claim 29, further comprising:
generating, by the controlled responding node, a content response including at least one of the one or more static values and at least one new static value;
receiving, by the controlled requesting node, an intermediate node response based on the content response; and
checking, by the controlled requesting node, the at least one of the one or more static values and the at least one new static value in the intermediate node response to determine a functionality of the intermediate node.

31. The method of claim 14, further comprising:
generating, by the controlled responding node, a content response including a script or piece of code;
receiving, by the controlled requesting node, an intermediate node response based on the content response; and
checking, by the controlled requesting node, the script or the piece of code in the intermediate node response to determine if the intermediate node is filtering the script or piece of code.

32. The method of claim 14, further comprising determining, by the at least one system node, if an amount of traffic that the intermediate node can support changes based on a number of the node requests.

33. The method of claim 14, further comprising:
generating, by the controlled requesting node, a plurality of node requests to a controlled responding node based on the candidate node data of the at least one intermediate node, wherein a data type requested by each of the plurality of node requests is different; and
determining, by the at least one system node, one or more communication types supported data types supported by the intermediate node.

34. The method of claim 14, further comprising:
receiving, by the controlled responding node, a content request from the intermediate node based on the node request; and
checking, by the controlled responding node, the static values in the content request to determine a functionality of the intermediate node.

35. The method of claim 14, further comprising:
receiving, by the controlled responding node, a content request from the intermediate node based on the node request;
generating, by the controlled responding node, a content response based on the content request;
receiving, by the controlled requesting node, an intermediate node response based on the content response;
collecting, by the controlled requesting node, the requesting node data, the requesting node data including at least one of the node request, the intermediate node response;
collecting, by the controlled responding node, responding node data including at least one of the content request and the content response; and
determining, by the at least one system node, a functionality of the intermediate node based on at least one of the requesting node data and the responding node data.

36. The method of claim 35, further comprising storing at least one of the requesting node data and responding node data in the logical data repository.

37. The method of claim 14, further comprising determining whether a known set of data received from the controlled responding node has been modified.

38. The system of claim 1, wherein the at least one system node comprises at least one of the logical data repository, the controlled requesting node and the controlled responding node.

39. The system of claim 1, wherein the controlled requesting node generates a plurality of node requests to the controlled responding node for target content based on the candidate node data of the at least one intermediate node, a communication type of each of the plurality of node requests is different, and the at least one system node determines one or more communication types supported by the intermediate node based on the plurality of requests.

40. The system of claim 1, wherein the controlled requesting node includes one or more static values in the node request, the controlled responding node receives a content request from the intermediate node based on the node request, and the controlled responding node checks the one or more static values in the content request to determine a functionality of the intermediate node.

41. The system of claim 40, wherein the controlled responding node generates a content response including at least one of the one or more static values and at least one new static value, the controlled requesting node receives an intermediate node response based on the content response, and the controlled requesting node checks the at least one of the one or more static values and the at least one new static value in the intermediate node response to determine a functionality of the intermediate node.

42. The system of claim 1, wherein the controlled responding node generates a content response including a script or piece of code, the controlled requesting node receives an intermediate node response based on the content response, and the controlled requesting node checks the script or the piece of code in the intermediate node response to determine if the intermediate node is filtering the script or piece of code.

43. The system of claim 1, wherein the at least one system node determines if an amount of traffic that the intermediate node can support based on a number of the node requests.

44. The system of claim 1, wherein the controlled requesting node generates a plurality of node requests to a controlled responding node based on the candidate node data of the at least one intermediate node, wherein a data type requested by each of the plurality of node requests is different, and the at least one system node determines one or more communication types supported data types supported by the intermediate node based on the data types requested and received.

45. The system of claim 1, wherein the controlled responding node receives a content request from the intermediate node based on the node request, and the controlled responding node checks the static values in the content request to determine a functionality of the intermediate node.

46. The system of claim 1, wherein the controlled responding node receives a content request from the intermediate node based on the node request, the controlled responding node generates a content response based on the content request, the controlled requesting node receives an intermediate node response based on the content response, the controlled requesting node collects the requesting node data, the requesting node data including at least one of the node request, the intermediate node response, the controlled responding node collects responding node data including at least one of the content request and the content response, and the at least one system node determines a functionality of the intermediate node based on at least one of the requesting node data and the responding node data.

47. The system of claim 1, wherein at least one of the requesting node data and responding node data is stored in the logical data repository.

48. The system of claim 38, wherein the controlled requesting node determines whether a known set of data received from the controlled responding node has been modified.

49. The system of claim 48, wherein the system node discerns that the data has been modified and the intermediate node is not viable.

50. The system of claim 49, wherein the system node discerns how the data had been modified.

51. The system of claim 50, wherein the system node takes corrective measures to render the intermediate node viable.

52. The system of claim 1, wherein the controlled requesting node is further configured to iterate through a series of tests, the results of which are used by the system node to determine safety- or functionality-related data of the intermediate node.

53. The system of claim 52 wherein the tests comprise one selected from the group consisting of: the controlled requesting node using different types of communication standards and comparing results of using each of the types of communication standard, the controlled requesting node using different TCP commands and comparing results of using each of the types of TCP command, and the controlled requesting node using different HTTP/TCP header values and comparing results of using each of the HTTP/TCP header values.

\* \* \* \* \*